(12) United States Patent
Min et al.

(10) Patent No.: US 11,171,384 B2
(45) Date of Patent: Nov. 9, 2021

(54) SECONDARY BATTERY

(71) Applicant: LG Chem, Ltd., Seoul (KR)

(72) Inventors: Geon Woo Min, Daejeon (KR); Hang Soo Shin, Daejeon (KR); Do Gyun Kim, Daejeon (KR); Sang Suk Jung, Daejeon (KR); Chan Bae Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/614,262

(22) PCT Filed: Nov. 7, 2018

(86) PCT No.: PCT/KR2018/013447
§ 371 (c)(1),
(2) Date: Nov. 15, 2019

(87) PCT Pub. No.: WO2019/098592
PCT Pub. Date: May 23, 2019

(65) Prior Publication Data
US 2020/0091482 A1    Mar. 19, 2020

(30) Foreign Application Priority Data
Nov. 17, 2017   (KR) .................. 10-2017-0153649

(51) Int. Cl.
*H01M 50/342*   (2021.01)
*H01M 50/147*   (2021.01)
(Continued)

(52) U.S. Cl.
CPC ..... *H01M 50/3425* (2021.01); *H01M 50/147* (2021.01); *H01M 50/152* (2021.01); *H01M 50/578* (2021.01)

(58) Field of Classification Search
CPC .. H01M 2/1241; H01M 2/0404; H01M 2/046; H01M 2/345; H01M 50/147;
(Continued)

(56) References Cited

U.S. PATENT DOCUMENTS

2002/0122974 A1    9/2002  Kim
2005/0026033 A1*   2/2005  Kawano .............. H01M 2/1229
                                                          429/53
(Continued)

FOREIGN PATENT DOCUMENTS

CN    201436692 U    4/2010
CN    104868064 A    8/2015
(Continued)

OTHER PUBLICATIONS

International Search Report from Application No. PCT/KR2018/013447 dated Feb. 12, 2019, 2 pages.
(Continued)

*Primary Examiner* — Mayla Gonzalez Ramos
(74) *Attorney, Agent, or Firm* — Lerner, David, Littenberg, Krumholz & Mentlik, LLP

(57) ABSTRACT

The disclosed secondary battery is capable of preventing a short-circuit pressure at which the safety vent is ruptured from being reduced due to deformation of the safety vent during assembly of the battery. The secondary battery of the present invention includes a can member accommodating an electrode assembly and a top cap assembly covering an opening of the can member. A safety vent is provided in the top cap assembly to discharge a gas when an inner pressure of the can member increases, wherein the safety vent includes a main body and a bending unit, in which an outer edge of the main body is bent, and wherein a buffering space is defined between the bending unit and the main body.

11 Claims, 5 Drawing Sheets

(51) Int. Cl.
*H01M 50/152* (2021.01)
*H01M 50/578* (2021.01)

(58) Field of Classification Search
CPC .............. H01M 50/152; H01M 50/30; H01M 50/3425; H01M 50/572; H01M 50/578; Y02E 60/10
USPC .......................................................... 429/89
See application file for complete search history.

(56) References Cited

U.S. PATENT DOCUMENTS

| | | | |
|---|---|---|---|
| 2006/0024576 A1* | 2/2006 | Tsutsui | H01M 2/0413 429/185 |
| 2009/0311583 A1 | 12/2009 | Wu | |
| 2010/0159310 A1 | 6/2010 | Kim | |
| 2010/0203367 A1 | 8/2010 | Che et al. | |
| 2011/0171508 A1 | 7/2011 | Kim | |
| 2011/0200854 A1 | 8/2011 | Bak et al. | |
| 2013/0309529 A1 | 11/2013 | Yokoyama et al. | |
| 2015/0004446 A1 | 1/2015 | Kim et al. | |
| 2015/0236317 A1 | 8/2015 | Lee et al. | |
| 2017/0309881 A1* | 10/2017 | Lee | H01M 2/046 |
| 2018/0062122 A1 | 3/2018 | Lee et al. | |

FOREIGN PATENT DOCUMENTS

| | | | | |
|---|---|---|---|---|
| CN | 107305936 A | | 10/2017 | |
| CN | 207852780 U | | 9/2018 | |
| JP | H01151154 A | | 6/1989 | |
| JP | H04206451 A | | 7/1992 | |
| KR | 20020071179 A | | 9/2002 | |
| KR | 20100073538 A | | 7/2010 | |
| KR | 20110038645 A | | 4/2011 | |
| KR | 20110082346 A | | 7/2011 | |
| KR | 20110095118 A | | 8/2011 | |
| KR | 20130024576 A | * | 3/2013 | |
| KR | 20130024576 A | | 3/2013 | |
| KR | 20140106326 A | | 9/2014 | |
| KR | 20140106329 A | | 9/2014 | |
| KR | 20160100054 A | | 8/2016 | |
| KR | 20170009096 A | | 1/2017 | |
| KR | 20170121636 A | | 11/2017 | |
| WO | 2012120758 A1 | | 9/2012 | |
| WO | WO-2016195457 A1 | * | 12/2016 | ............ H01M 2/046 |

OTHER PUBLICATIONS

Extended European Search Report including the Written Opinion for Application No. EP 18879638.7 dated Feb. 20, 2020, 6 pages.
Chinese Search Report for Application No. 201880023916.5 dated Sep. 16, 2021, pp. 1-3.

* cited by examiner

SECONDARY BATTERY

CROSS-REFERENCE TO RELATED APPLICATION

This application is a national phase entry under 35 U.S.C. § 371 of International Application No. PCT/KR2018/013447, filed Nov. 7, 2018, which claims priority from Korean Patent Application No. 10-2017-0153649, filed on Nov. 17, 2017, the disclosure of which is incorporated herein by reference.

TECHNICAL FIELD

The present invention relates to a secondary battery, and more particularly, to a secondary battery that is capable of preventing a short-circuit pressure from being reduced when short circuit occurs.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A secondary battery according to the related art is disclosed in Korean Patent Publication No. 10-2011-0095118.

In the secondary battery, when an inner pressure increases, an inner gas is discharged to the outside through a top cap assembly, and a safety vent for discharging the inner gas is formed in the top cap assembly.

The safety vent is a constituent in which a notch formed in a vent flange part provided between the top cap assembly and a can is cut when the inner pressure of the can increases to form a passage for discharging a gas.

However, when the top cap assembly is coupled to the can according to the related art, the top cap assembly is coupled to the can through a crimping process of bending the can.

Here, external force is applied to the safety vent during the crimping process, which may cause a shape of a safety vent operation part to deform.

When the shape of the safety vent operation part is deformed, an actual short-circuit pressure at which the safety vent is ruptured is lower than a designed short-circuit pressure, which may lead to a deterioration in battery safety.

DISCLOSURE OF THE INVENTION

Technical Problem

Thus, the present invention has been made to solve the above problems, and an object of the present invention is to provide a secondary battery in which a safety vent is improved to prevent a short-circuit pressure from being reduced.

Technical Solution

A secondary battery according to an embodiment of the present invention includes a can member accommodating an electrode assembly, a top cap assembly covering an opening of the can member, and a safety vent provided in the top cap assembly to discharge a gas when an inner pressure of the can member increases, wherein the safety vent includes a main body and a bending unit in which an outer edge of the main body is bent, wherein a buffering space is defined between the bending unit and the main body.

The bending unit may include a standing part bent to stand up from the outer edge of the main body, a support part bent from an end of the standing part toward the inside of the main body, and a contact part bent from an end of the support part along a surface of the main body to contact the main body.

The support part may include an upper portion bent from an end of the standing part in a direction parallel to a top surface of the main body and a bridge portion connecting an end of the upper portion to the contact part.

The support part may be provided as an inclined surface.

A circumference of the buffering space may be surrounded by the main body, the standing part, and the support part.

The buffering space may be defined in a ring shape.

The bending unit may be coupled to the can member by crimping or bending an opening of the can member.

The buffering space may buffer a pressure during the crimping.

The secondary battery may further include a crimping gasket that insulates the bending unit from the can member.

The secondary battery may further include a buffer member inserted into the buffering space.

The buffer member may be made of at least one material of rubber, a synthetic resin, and silicone.

Advantageous Effects

According to the present invention, the deformation of the safety vent in the crimping process may be prevented from occurring.

According to the present invention, the safety vent and the current interruption member disconnect to constantly maintain the short-circuit pressure, which is the pressure at which the secondary battery stops functioning.

According to the present invention, when the short circuit occurs, the short-circuit pressure may be constantly maintained to suppress the additional reaction within the secondary battery.

According to the present invention, when the short circuit occurs, the short-circuit pressure may be constantly maintained to prevent the secondary battery from exploding or igniting.

MODE FOR CARRYING OUT THE INVENTION

Figure 1:
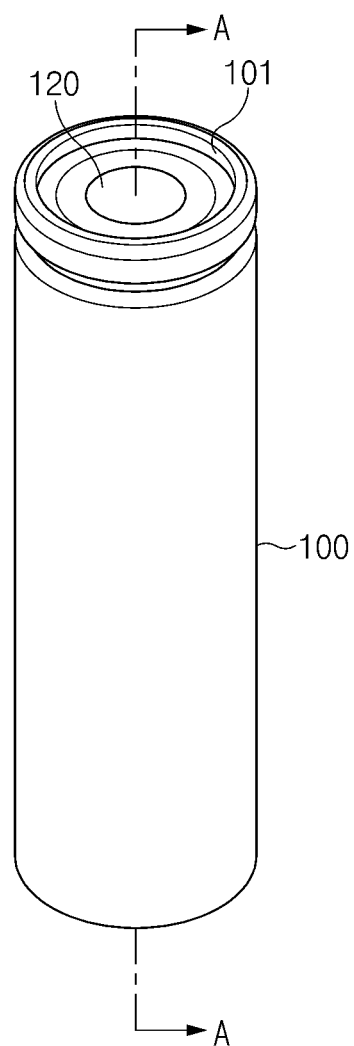
FIG. 1 is a perspective view of a secondary battery according to an embodiment of the present invention.

Hereinafter, a secondary battery according to a preferred embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure the subject matter of the present invention.

Figure 2:
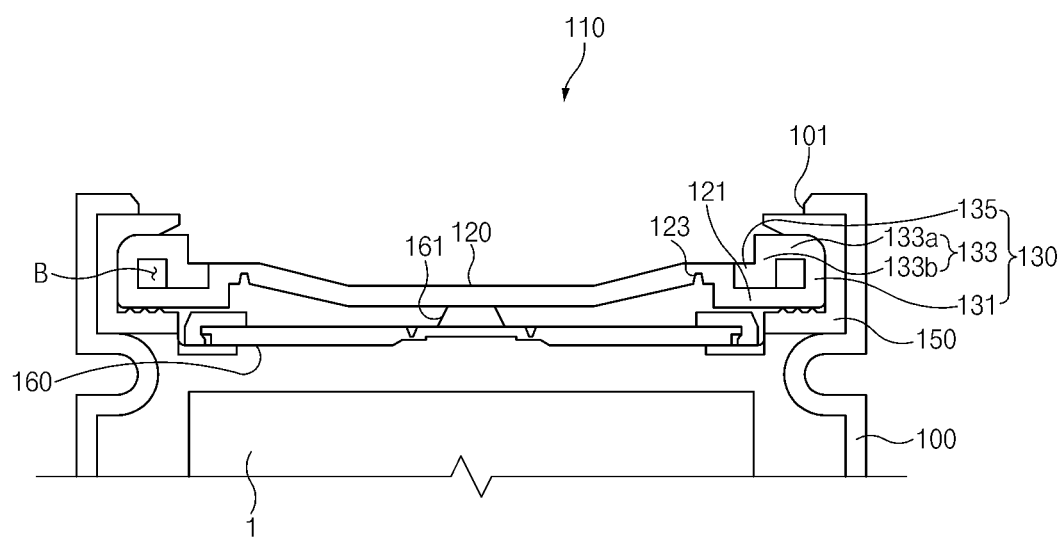
FIG. 2 is a cross-sectional view taken along line A-A of FIG. 1 so as to show a main part of the secondary battery according to an embodiment of the present invention.

FIG. 1 is a perspective view of a secondary battery according to an embodiment of the present invention, and FIG. 2 is a cross-sectional view taken along line A-A of FIG. 1 so as to show a main part of the secondary battery according to an embodiment of the present invention.

As illustrated in FIGS. 1 and 2, a secondary battery according to an embodiment of the present invention includes a can member accommodating an electrode assembly 1, a top cap assembly 110 covering an opening 101 of the can member 100, and a safety vent 120 provided in the top cap assembly 110 to discharge a gas when an inner pressure of the can member 100 increases. The safety vent 120 includes a main body 121 and a bending unit 130 in which an outer edge of the main body 121 is bent. A buffer space B is formed between the bending unit 130 and the main body 121.

For example, the electrode assembly 1 may be manufactured by stacking a positive electrode coated with a positive electrode active material, a negative electrode coated with a negative electrode active material, and a separator disposed between the positive electrode and the negative electrode several times.

Also, the electrode assembly 1 may be manufactured by winding the stack, in which the positive electrode, the separator, and the negative electrode are stacked, in a jelly-roll shape.

The can member 100 may be a container made of a metal material having an approximately cylindrical shape with an opened upper side in a circular type lithium ion secondary battery or a container made of a metal material having an approximately prismatic shape with an opened upper side in a prismatic type lithium ion secondary battery. In general, the can member 100 may be made of at least one of aluminum, an aluminum alloy, and stainless steel, which is light and easy to cope with corrosion.

The can member 100 may serve as a container for the electrode assembly 1 and an electrolyte (not shown). The electrode assembly 1 may be inserted into the can member 100 through an opened upper end of the can member 100, i.e., an upper end opening, and then, the upper end opening of the can member 100 may be sealed by the top cap assembly 110.

The top cap assembly 110 may include safety vent 120 and a current interruption member 160 coupled to a lower portion of the safety vent 120.

The safety vent 120 may include a notch part 123 that is formed to be recessed in the safety vent 120 and ruptured by an inner pressure of the can member 100 so as to discharge a gas within the can member 100 when the inner pressure of the can member 100 increases.

The current interruption member 160 has a central portion 161 coupled to the lower portion of the safety vent 120. When the inner pressure of the can member 10 increases, the central portion 161 together with a rupture portion of the safety vent 120 may be ruptured to interrupt current.

Figure 3:
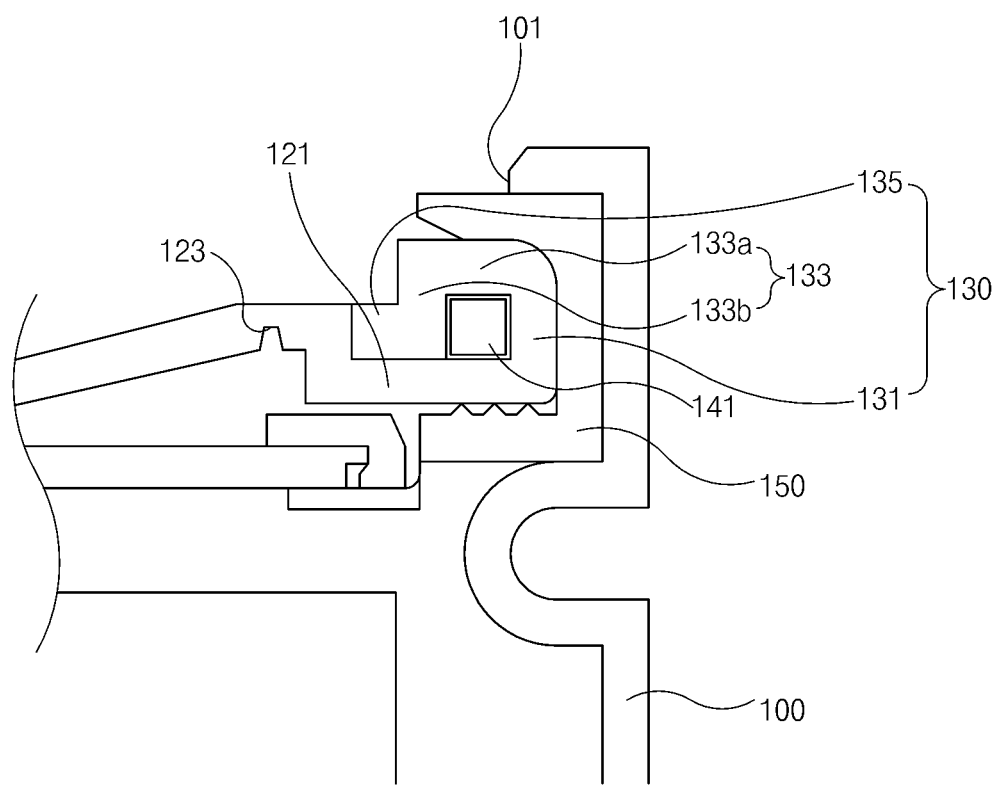
FIG. 3 is a cross-sectional view illustrating a state in which a buffer member is inserted by enlarging a buffering space in FIG. 2.

FIG. 3 is a cross-sectional view illustrating a state in which a buffer member is inserted by enlarging a buffering space in FIG. 2.

As illustrated in FIG. 3, the bending unit 130 may include a standing part 131 bent to stand up from the outer edge of the main body 121 of the safety vent 120, a support part 133 bent from an end of the standing part 131 toward the inside of the main body 121, and a contact part 135 bent from an end of the support part 133 along a surface of the main body 121 to contact the main body 121.

The contact part 135 may be coupled to a surface of the main body 121 in a concave-convex manner or may be coupled by welding or the like.

For example, the support part 133 may include an upper portion 133a bent from an end of the standing part 131 in a direction parallel to a top surface of the main body 121 and a bridge portion 133b bent from an end of the upper portion 133a to connect the upper portion 133a to the contact part 135.

The buffer member 141 may be inserted into the buffering space B to enhance a buffer function of the buffering space B.

Figure 4:
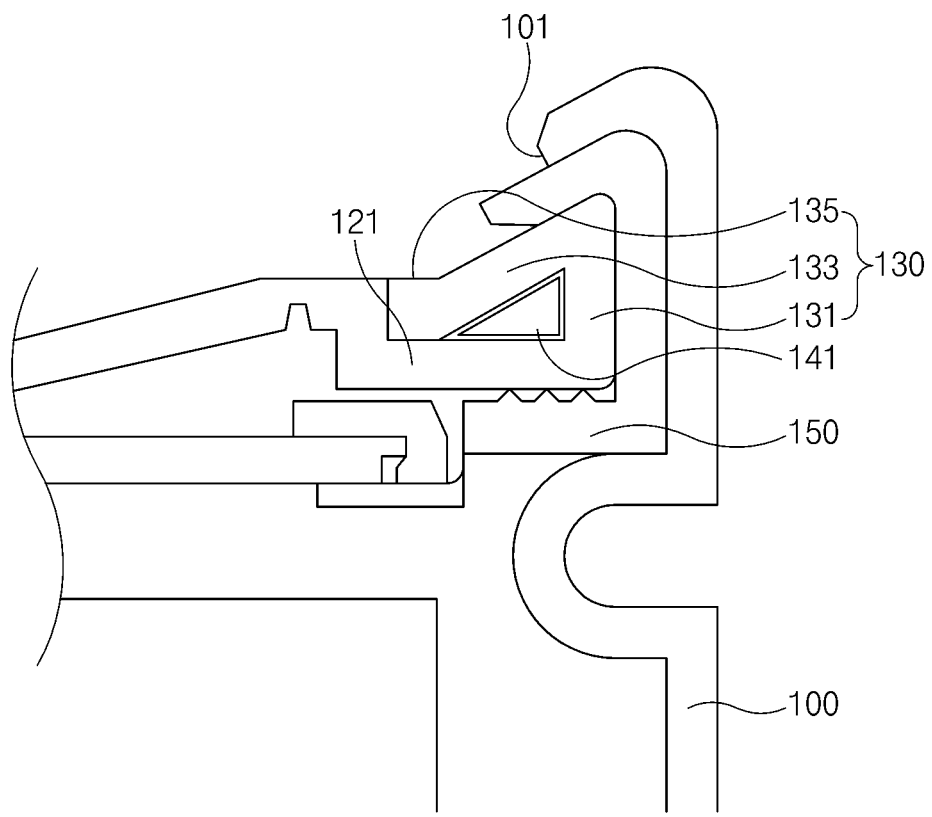
FIG. 4 is a cross-sectional view illustrating a state in which a buffer member is inserted by enlarging a buffering space of a secondary battery according to another embodiment of the present invention.

FIG. 4 is a cross-sectional view illustrating a state in which a buffer member is inserted by enlarging a buffering space of a secondary battery according to another embodiment of the present invention.

As illustrated in FIG. 4, according to another embodiment, a support part 133 may be bent to be inclined from an end of a standing part 131 to a contact part 135 and thereby to be connected from the standing part 131 to the contact part 135.

A buffering space B may be formed in a shape corresponding to that of an outer edge of a safety vent 120 having a ring shape.

The buffering space B may have a circumference surrounded by a main body 121, the standing part 131, and the support part 133.

A top cap assembly 110 may be coupled to a can member 100 through a crimping process.

In the cramping process, an opening 101 of the can member 100 is bent to press the safety vent 120 of the top cap assembly 100 through a pressure of the bent opening 101 so that the top cap assembly 110 is coupled to the can member 100.

A crimping gasket 150 may be provided between the opening 101 of the can member 100 and the top cap assembly 110 to insulate the can member 100, the top cap assembly 110, and the bending unit 130 of the safety vent 120 from each other.

Here, when the bent opening 101 presses the bending unit 130 of the safety vent 120, the buffering space B formed in the bending unit 130 may serve as a damper for buffering the pressure applied from the bent opening 101.

That is, when the pressure of the bent opening 101 is applied to the support part 133 of the bending unit 130 surrounding the buffering space B having the ring shape, the support part 133 bent from the standing part 131 may be pushed toward the buffering space B to buffer the pressure of the opening 101.

As described above, when the support part 133 of the bending unit 130 buffers the pressure of the opening 101 due to the crimping process, the main body 121 may be prevented from being deformed by the pressure of the opening 101.

Since the main body 121 of the safety vent 120 is prevented from being deformed, the function of the safety vent 120 will not be deteriorated, and thus, when the inner pressure of the can member 100 increases, a notch part 123 of the safety vent 120 will rupture normally to discharge a gas.

When an inclined surface of the support part 133 of the bending unit 130 is formed, the inclined surface may be inclined such that its height decreases along a direction extending inwardly from the outside of the top cap assembly 110. Thus, as shown in FIG. 4, the opening 101 bent through the crimping process may wrap around the top of the bending unit 130 and engage the inclined surface of the support part 133, so as to increase the coupling force of the top cap assembly 110.

Figure 5:
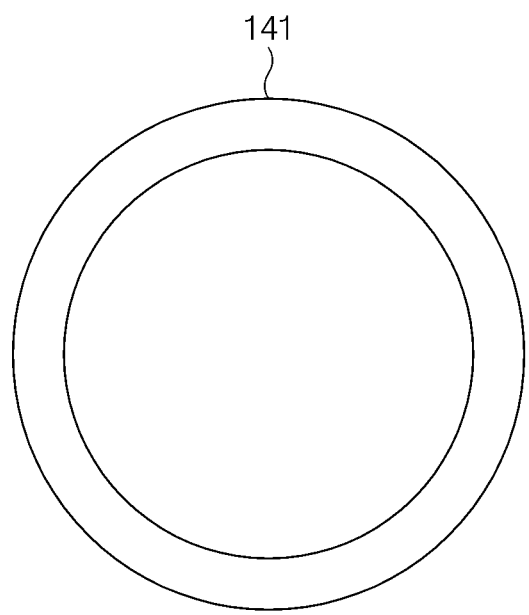
FIG. 5 is a plan view of the buffer member according to an embodiment of the present invention.

FIG. 5 is a plan view of the buffer member according to an embodiment of the present invention.

Referring to FIGS. 3 to 5, the buffer member 141 may be inserted into the buffering space B of the secondary battery according to an embodiment of the present invention.

The buffer member 141 may have a shape corresponding to the buffering space B to enhance the buffer function of the buffering space B.

That is, the buffer member 141 may have a ring shape and be made of at least one material selected from the group consisting of rubber, a synthetic resin, fiber, and silicone having elasticity. The buffer member 141 may be inserted into the buffering space B to buffer the pressure applied to the buffering space B.

In the state in which the buffer member 141 is disposed at the outer edge of the safety vent 120, the bending unit 130 may be formed so that the buffer member 141 is inserted into the buffering space B. Alternatively, if the buffer member 141 is made of a material selected from the group consisting of rubber, a synthetic resin, fiber, and silicone, the bending unit 130 of the safety vent 120 may be formed first, and then, the rubber, the synthetic resin, the fiber, or the silicone may be filled into the buffering space B to manufacture the buffer member 141.

As described above, according to the present invention, the deformation of the safety vent in the crimping process may be prevented from occurring.

According to the present invention, the safety vent and the current interruption member disconnect to constantly maintain the short-circuit pressure, which is the pressure at which the secondary battery stops functioning.

According to the present invention, when the short circuit occurs, the short-circuit pressure may be constantly maintained to suppress the additional reaction within the secondary battery.

According to the present invention, when a short circuit occurs, the short-circuit pressure may be constantly maintained to prevent the secondary battery from exploding or igniting.

Although the secondary battery according to the present invention has been described above with reference to the exemplary drawings, various changes and modifications may be made thereto by one skilled in the art without departing from the scope and spirit of the invention as set forth in the appended claims.

The invention claimed is:

1. A secondary battery comprising:
a can member accommodating an electrode assembly therein, the can member having a longitudinal axis extending along a longitudinal direction;
a top cap assembly covering an opening of the can member; and
a safety vent provided in the top cap assembly to discharge a gas when an inner pressure of the can member increases,
wherein the safety vent comprises:
a main body; and
a bending unit defined by a bent portion of a radially peripheral portion of the main body, the bending unit including:
a standing part connected to a radially extending portion of the main body at a first radial location, the standing part extending upwardly from the first radial location transverse to the radially extending portion;
a support part connected to the standing part at a second radial location spaced from the first radial location along the longitudinal direction, the support part extending radially inwardly from the second location to a contact part directly contacting the main body at a third radial location disposed closer to the longitudinal axis than the first radial location;
wherein a buffering space is defined between the bending unit and the main body, the buffering space defining an annular volume disposed between the first, second, and third radial locations and encircled by the main body, the standing part, and the support part.

2. The secondary battery of claim 1, wherein the contact part is bent from an end of the support part at the third radial location so as to extend along a surface of the main body in direct contact with the main body.

3. The secondary battery of claim 1, wherein the support part comprises:
an upper portion bent from an end of the standing part at the second radial location so as to extend radially inwardly along a direction parallel to the radially extending portion of the main body; and a bridge portion connecting an end of the upper portion to the contact part at the third radial location.

4. The secondary battery of claim 1, wherein the support part extends along an inclined surface between the second radial location and the third radial location.

5. The secondary battery of claim 1, wherein the bending unit is coupled to the can member by crimping or bending an opening of the can member.

6. The secondary battery of claim 5, wherein the buffering space buffers a pressure during the crimping or bending of the opening of the can member.

7. The secondary battery of claim 5, further comprising a crimping gasket that insulates the bending unit from the can member.

8. The secondary battery of claim 1, further comprising a buffer member received within the buffering space.

9. The secondary battery of claim 8, wherein the buffer member is made of at least one material selected from the group consisting of rubber, a synthetic resin, and silicone.

10. The secondary battery of claim 4, wherein an upper edge of the can member wraps around a top of the bending unit and engages the inclined surface of the support part.

11. The secondary battery of claim 5, wherein the crimping or bending of the opening of the can member results in an upper edge of the can member wrapping around a top of the bending unit.

* * * * *